United States Patent [19]

Ito

[11] Patent Number: 5,297,454
[45] Date of Patent: Mar. 29, 1994

[54] INDEXING DEVICE OF MACHINE TOOL

[75] Inventor: Toshio Ito, Gifu, Japan

[73] Assignee: Howa Machinery, Ltd., Aichi, Japan

[21] Appl. No.: 888,902

[22] Filed: May 26, 1992

[30] Foreign Application Priority Data

May 24, 1991 [JP] Japan .................. 3-149623

[51] Int. Cl.⁵ .................. F16H 27/02; B23B 29/24
[52] U.S. Cl. .................. 74/816; 74/126; 74/813 C; 74/826; 74/813 L
[58] Field of Search .................. 74/126, 813 R, 813 C, 74/826, 813 L, 816, 526, 815

[56] References Cited

U.S. PATENT DOCUMENTS

| | | | |
|---|---|---|---|
| 3,422,941 | 1/1969 | Fredell | 74/126 |
| 3,828,616 | 8/1974 | De Lille et al. | 74/126 |
| 3,860,108 | 1/1975 | Farfaglia | 74/126 |
| 4,018,093 | 4/1977 | Nilsson | 74/126 |
| 4,558,611 | 12/1985 | Boffelli | 74/826 |
| 4,611,630 | 9/1986 | Muchow et al. | 74/126 |
| 4,852,428 | 8/1989 | Haga et al. | 74/813 C |

FOREIGN PATENT DOCUMENTS

| | | | |
|---|---|---|---|
| 2830760 | 1/1980 | Fed. Rep. of Germany | 74/126 |
| 63-39752 | 2/1988 | Japan | 74/817 |
| 1-20030 | 4/1989 | Japan | 74/817 |
| 1-84943 | 6/1989 | Japan | 74/817 |

*Primary Examiner*—Vinh T. Luong
*Attorney, Agent, or Firm*—Wenderoth, Lind & Ponack

[57] ABSTRACT

A device for rotationally indexing an indexing table by utilizing a synchronized tap function of a machine tool main spindle. The rotation and the axial feeding displacement of the main spindle are in a specific synchronized relation. When the main spindle is fed forward, it engages an input shaft of the indexing device and thrusts it to retract against a spring force. Upon arriving at a retracted position of the input shaft, the main spindle starts rotation in one direction. Because of a one-way clutch between the input shaft and the indexing table, the rotation of the input shaft imparted by the main spindle is not transmitted to the indexing table. After a predetermined angular rotation and an axial feed, the main spindle is rotated in the reverse direction to be withdrawn axially. At this time the one-way clutch operates to transmit the reverse rotation to the indexing table. The indexing device is of compact construction and ensures accurate indexing.

12 Claims, 6 Drawing Sheets

INDEXING DEVICE OF MACHINE TOOL

BACKGROUND OF THE INVENTION

The present invention relates to an indexing device utilizing rotation of a main spindle of a machine tool such as a machining center.

An indexing device of the above character is disclosed in Japanese Utility Model Laid-Open Pub. No. Hei 1-84,943. In this indexing device, a clutch member is provided on the tip of an input shaft rotatably supported in the main body of the indexing device disposed on a work table of a machine tool. The clutch member is adapted to be engaged with a clutch member of a drive adapter detachably mounted on a main spindle of the machine tool to ensure that the rotation of the main spindle causes rotation of the input shaft. The indexing table is rotationally indexed by means of a Geneva mechanism incorporated in the main body. The indexing rotation of the Geneva mechanism is detected by an indexing detection switch disposed on the side of the main body, and the obtained indexing signals are transmitted to the side of the machine tool to stop the rotation of the main spindle of the machine tool.

As is disclosed in Japanese Patent Pub. No. Hei 12,003, 20,030, known is a tooth-shaped coupling interposed between a member to be indexed and a housing carrying the member to be indexed, the coupling serving as a means for preventing positional offset of the indexed position of the member to be indexed.

Furthermore, Japanese Patent Pub. No. Sho 63-39,752 discloses a positioning device in which the main spindle of the machine tool vertically moves a push bar, which in turn causes a swing lever to swing, to bring a positioning pin provided on the swing lever into and out of engagement with an engagement claw of an indexing table.

In the prior art described above, a signal line for transmitting signals, obtained by an indexing detection switch on the side of the indexing device, to the machine tool, independent from the indexing device, must be provided between the two. In this case, the indexing device is mounted on a pallet. Therefore, the signal line must be connected or disconnected when the pallet is automatically replaced, which makes it difficult to mount the indexing device onto the pallet.

Furthermore, in the device for preventing positional offset described above, in case a worm shaft has not rotated by an intended amount, a worm cannot be rotated due to self-lock of a worm wheel to eliminate the positional offset, in spite of an attempt for correction to a desired indexing position by engaging the tooth-shaped coupling.

In the positioning device described above, the positioning pin is engaged with and disengaged from the engagement claw by swinging movement of the swing lever, which necessitates a rather large space for the swinging movement, thus inconveniently leading to an increase in size of the entire device.

SUMMARY OF THE INVENTION

It is therefore an object of the present invention to provide an indexing device free of the above described problems and capable of indexing an indexing table by utilizing a 'synchronized tap function' which has been recently generally employed as a main spindle control function. The term 'synchronized tap function' referred to herein means a function ordinarily used in a threading operation for synchronizing the revolution number (rotational angle) of the main spindle with its axial displacement. With this function, a tap integral with the main spindle with respect to both its rotational direction and its axial direction is axially displaced by a thread pitch of the tap per one revolution thereof for executing threading operation, and the tap comes to a stop when completing the threading up to a predetermined depth. The tap is rotated in synchronism in the opposite direction for the removal of the tap from the threaded hole.

In order to achieve the above object, the indexing device in accordance with the present invention, which is capable of rotationally indexing an indexing table by utilizing rotation of an advanceable main spindle of a machine tool such as a machining center, comprises a drive adapter releasably mounted on the main spindle and having a first clutch member at its end. An input shaft means is rotatably supported in a main body of the indexing device and has at its end a second clutch member adapted to be engaged with the first clutch member, and in indexing table is rotatably supported on the main body and operatively connected to the input shaft means through a rotation transmission mechanism, to be indexed by the rotation of said main spindle. The input shaft means is supported to be retractable in its axial direction against an urging force when the main spindle advances and pushes the input shaft means, and a one-way clutch is interposed in the rotation transmission mechanism between the input shaft means and the indexing table.

According to the above construction, the second clutch member of the input shaft means is interlocked with the first clutch member of the drive adapter of the main spindle, and the main spindle is rotated in such a manner that the displacement in the axial direction of the main spindle and the rotational angle thereof are synchronized with each other by a synchronized tap function. The synchronized tap function permits a forward rotation of the input shaft means, which rotation is not operative to index the indexing table due to the one-way clutch, but during a reverse rotation following a stop, the one way clutch operates to execute the indexing operation. As the indexing operation is carried out by using the synchronized tap function, the rotational angle of the main spindle can be accurately controlled by solely operating the machine tool side, and the transmission and receipt of signals are not required between the indexing device and the machine tool.

The object and advantages of the present invention will become more apparent when viewed in conjunction with the accompanying drawings

DESCRIPTION OF THE PREFERRED EMBODIMENTS

Figure 1:
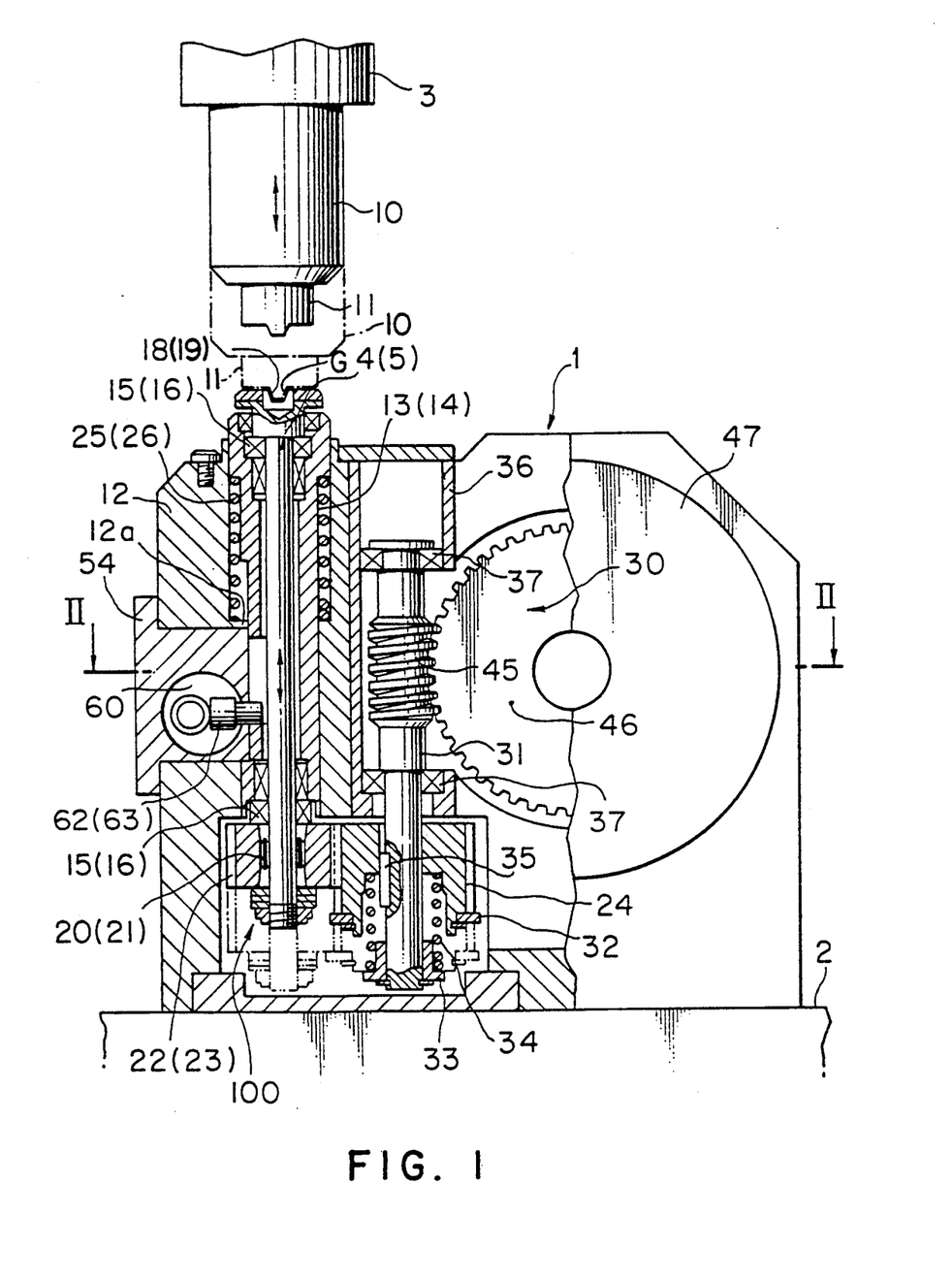
FIG. 1 is a vertical sectional view taken along a power transmission path of an indexing device according to the present invention.
Figure 2:
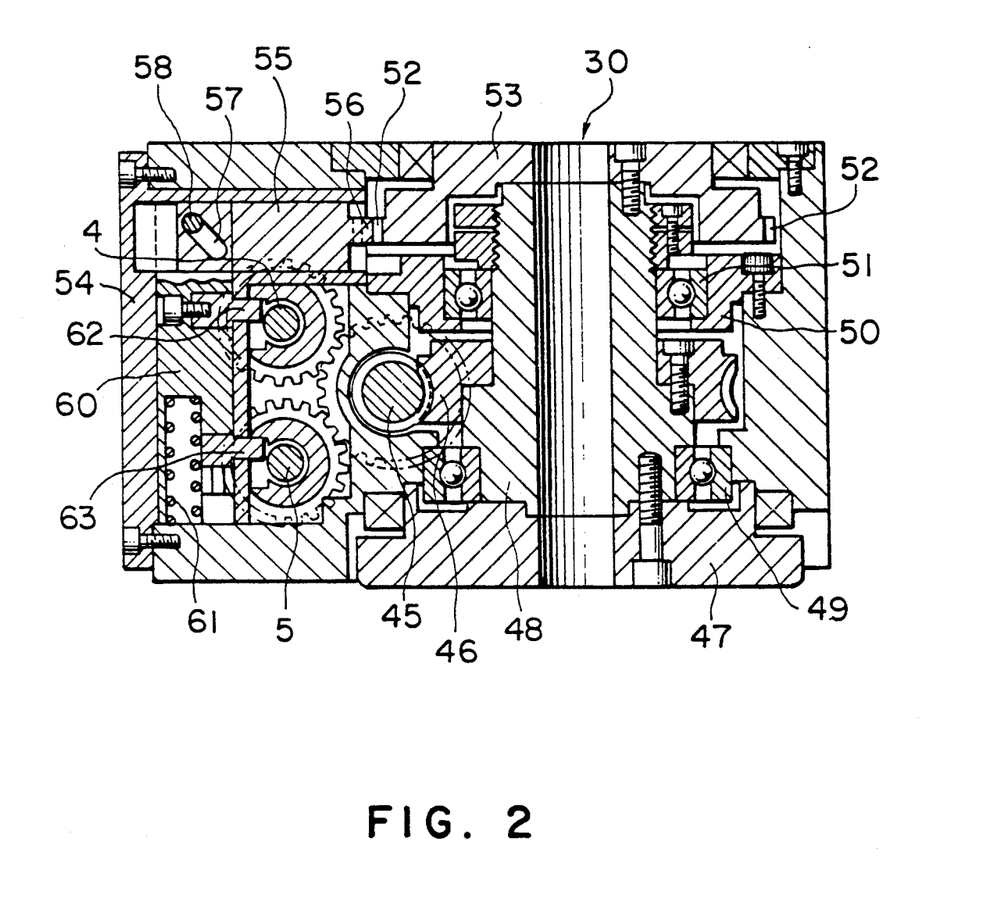
FIG. 2 a sectional view taken along a line II—II in FIG. 1
Figure 3:
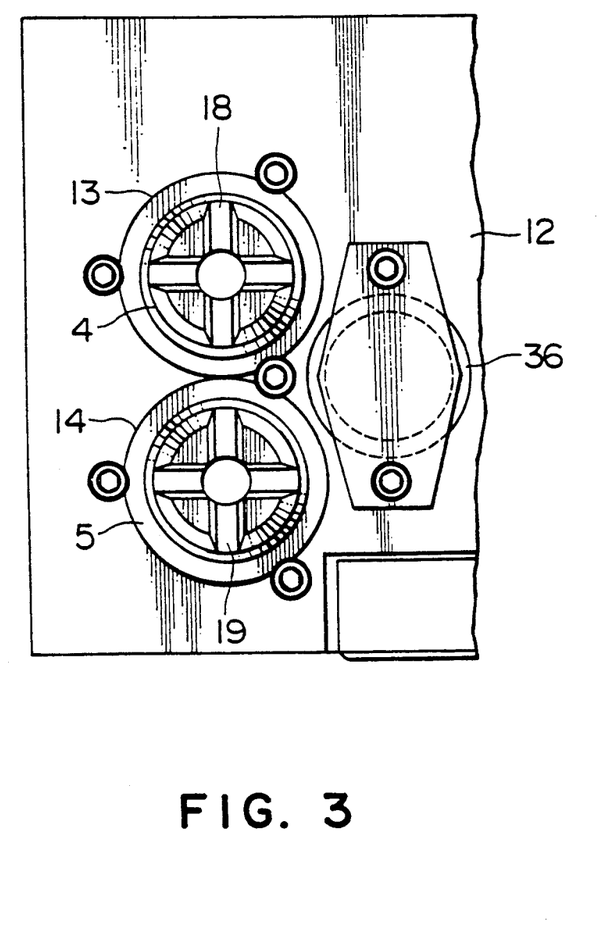
FIG. 3 is a plan view of a clutch.

An embodiment of the present invention will now be described with reference to the accompanying drawings. As shown in FIGS. 1 and 2, an indexing device in accordance with the present invention is generally designated 1 and mounted on a work table 2 of a machine tool such as a machining center. Immediately above the indexing device 1, there is provided a forwardly and reversely rotatable main spindle 3 in such a manner as to be displaceable in the X and Y directions (or horizontally) and in the Z axis direction (or the vertical direction) relative to the surface of the work table 2. The main spindle 3 includes at its lower end a releasably attached drive adapter 10 having at its tip a first clutch member 11 engageable with and disengageable from input shafts 4 and 5 that are capable of both-way rotation, as will be described later. The drive adapter 10 is held at a predetermined position relative to a tool magazine while the machining center is executing a machining operation on a workpiece on the work table 2.

In order to control the main spindle 3, the machining center has a so-called synchronized tap function, which is ordinarily used to form a threaded hole and enables the number of revolutions (or rotational angle) of the main spindle 3 to be in synchronism with the axial displacement thereof. More specifically, the synchronized tap function causes a tap integral with the main spindle 3 with respect to both its rotating direction and its axial direction to be axially lowered by a thread pitch of the tap per one rotation thereof for a threading operation, and to stop when threaded up to a predetermined depth, and then causes the tap to be rotated in the opposite direction in synchronism and to be raised for the removal of the tap from the threaded hole. It will therefore be appreciated that the main spindle 3 makes a clockwise rotation, a stop, and a counterclockwise rotation in the mentioned order in the case of right-handed screw rotation and a counterclockwise rotation, a stop, and a clockwise rotation in the case of left-handed screw rotation, in the same manner as in the threading operation.

Description will now be made of an input rotation transmission mechanism 100 intervening between the input shafts 4 and 5 and an indexing table 47 (FIG. 2). In FIG. 1, reference numeral 12 denotes the main body of the indexing device 1. The input shafts 4 and 5 are for right-handed screw rotation and left-handed screw rotation, respectively. These input shafts 4 and 5 are disposed vertically in parallel within the main body 12, and are rotatably supported by means of a pair of bearings 16, 15 and 16, 16, respectively, which are fixedly secured in respective vertical support sleeves 13 and 14 that are slidable vertically and reciprocatingly through the main body 12, each input shaft having a protrusion extending slightly upward from the main body 12. Each input shaft 4 or 5 is not displaceable relative to the associated support sleeve 13 or 14. The support sleeves 13 and 14 act to urge the input shafts 4 and 5 toward the clutch (or upward) by virtue of the compressive force of first springs 25 and 26, respectively, interposed between the support sleeves 13 and 14 and a shouldered hole 12a of the main body 12.

The above-mentioned protrusions of the input shafts 4 and 5 have at their upper ends second clutch members 18 and 19, each provided with a cross-shaped groove adapted to be releasably engaged with the clutch member 11. Drive gears 22 and 23 are drivingly connected to the lower ends of the input shafts 4 and 5 through one-way clutches 20 and 21, respectively. The one-way clutch 20 causes the drive gear 22 to be rotated in unison with the input shaft 4 when the input shaft 4 is turned counterclockwise, while the one-way clutch 21 causes the drive gear 23 to be rotated in unison with the input shaft 5 when the input shaft 5 is turned clockwise. The input shafts 4 and 5 are rotated idly without engaging the corresponding drive gears 22 and 23 when turned in the direction opposite to the foregoing.

The drive gears 22 and 23 associated with the input shafts, respectively, are each in engagement with a driven gear 24 fixedly mounted on a lower portion of a vertical worm shaft 31 of an orthogonal gear transmission 30 housed in the main body 12. The worm shaft 31 is rotatably supported within a worm bearing box 36 integral with the main body 12 by way of upper and lower bearings 37. The driven gear 24 is fitted in an axially reciprocative manner to the lower end of the worm shaft 31 through a key 35, and is forced upward by means of a spring 34 interposed between the driven gear 24 and a stopper 33 attached to the lower end of the worm shaft 31. A ring plate 32 forming an abutment is integrally secured to the lower end of the driven gear 24 so that when either the input shaft 4 or 5 is lowered through the reciprocation of the main spindle 3 in the Z axis direction, the lower end of the drive gear 22 or 23 will be brought into engagement with the plate 32, which presses down the driven gear 24 while meshing with the drive gear 22 and 23 against the force of the spring 34.

As is apparent from FIG. 2, a worm wheel 46 meshing with a worm 45 mounted in the middle of the worm shaft 31 is integrally fastened to a hollow worm wheel shaft 48 disposed within the main body 12, the worm wheel shaft 48 being rotatably supported through a bearing 49 housed in the main body 12 and a bearing 51 fitted into a bearing box 50 of the main body 12. The worm wheel shaft 48 has at its fore end the indexing table 47 integrally and rigidly attached thereto, and at its rear end a clamp plate 53 also integrally and rigidly attached thereto and having a multiplicity of meshing claws (or positioning locking portions) 52 arranged along the outer periphery thereof. In this embodiment, the worm 45 and the worm wheel 46 are designed to have such a gear ratio as to ensure that one revolution of the worm 45 rotates the worm wheel by 5 degrees for indexing, and the clamp plate 53 is provided with 72 pieces of meshing claws 52 so that the indexing table 47 can be positioned at locations obtained by equally angularly dividing the indexing table 47 into 72.

Figure 5:
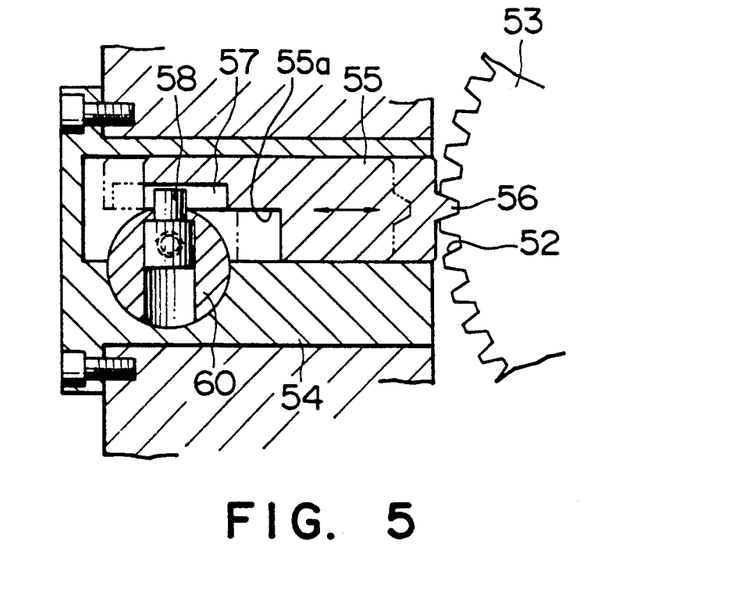
FIG. 5 is a detailed sectional view of a positioning shaft.

A positioning device will be explained hereinbelow. As shown in FIG. 2, toward a horizontal positioning slider 55 is reciprocatingly and slidably received in a holder 54, which is L-shaped in plan view and is fixedly attached to the main body 12 at the side of the two input shafts 4 and 5, for sliding toward and away from the meshing claws 52. The positioning slider 55 has one end portion integral with a positioning pin 56 adapted to be engaged with and disengaged from one of the meshing claws 52 of the clamp plate 53. Moreover, the bottom surface of a cutout 55a (FIG. 5) in the region of the other end of the positioning slider 55 is provided with a guide groove 57 extending obliquely with respect to the sliding direction of the slider 55.

As most clearly shown in FIG. 2, a transmission slider 60 reciprocably passes horizontally through the holder 54 perpendicularly to the positioning slider 55 across the input shafts 4 and 5, and is biased toward the positioning slider 55 by means of the spring 61. A vertical pin 58 on one end of the transmission slider 60 is fitted into the guide groove 57. The reciprocation of the transmission slider 60 moves the positioning slider 55 axially thereof through the engagement of the pin 58 with the guide groove 57 of the positioning slider 55, thereby enabling the positioning pin 56 to be engaged with and disengaged from the meshing claws 52 of the clamp plate 53.

Figure 6:
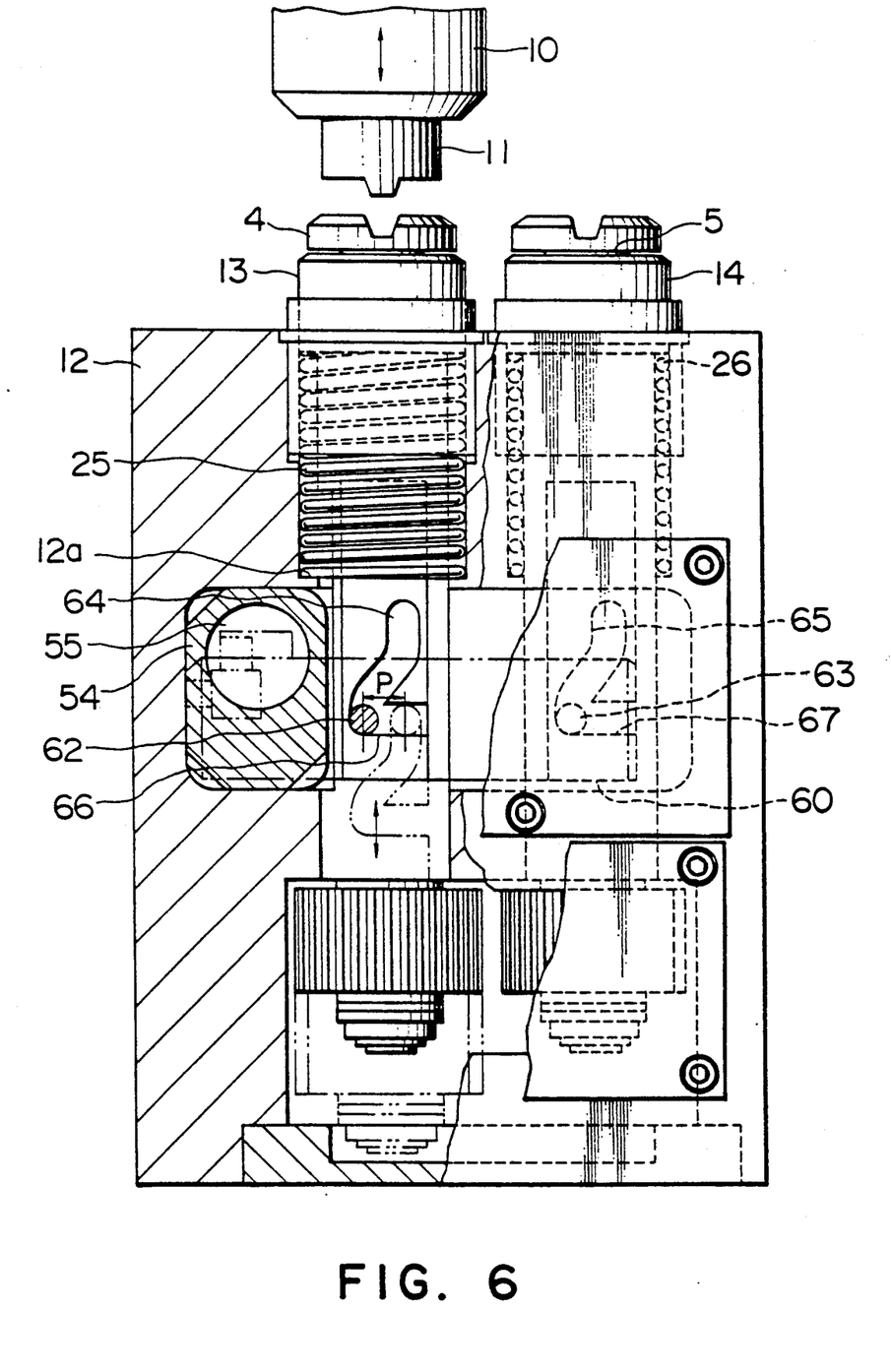
FIG. 6 is a front view of the present device with a part of and the cover cut away.

Referring now to FIGS. 2 and 6, guide pins 62 and 63 are attached to the transmission slider 60 at positions opposing the input shafts 4 and 5, respectively, and the tips of the guide pins are engaged with respective corresponding oblique guide grooves 64 and 65 provided in the middle of the support sleeves 13 and 14. The guide grooves 64 and 65 are provided with transverse grooves 66 and 67, respectively, communicating therewith in order to prevent interference of the guide pins 62 and 63 of the transmission slider 60 with the support sleeves 13 and 14, respectively, during the reciprocating movement of the transmission slider 60. When either one of the support sleeves 13 and 14 is slid in the axial direction, the guide grooves 64 and 65 will act on the corresponding guide pins 62 and 63 to axially reciprocate the transmission slider 60 by a distance P (FIG. 6).

Figure 4:
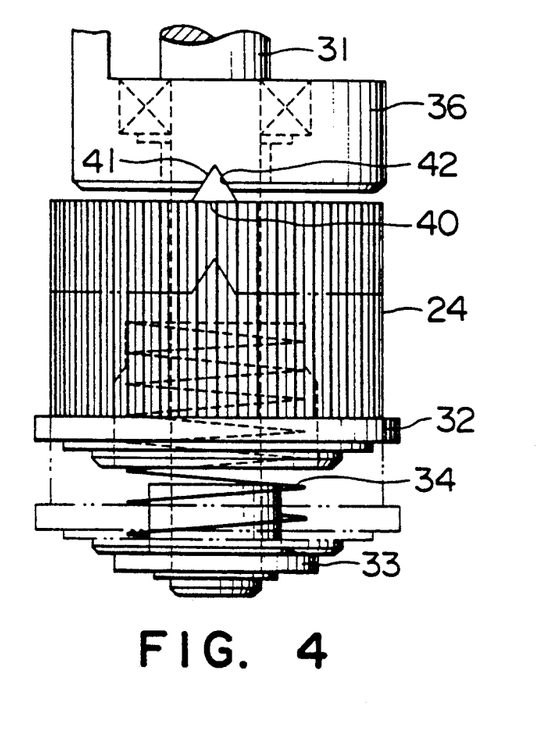
FIG. 4 a detail view of a correction mechanism.

Description will next be made of a correction mechanism of the indexing device 1. Referring to FIG. 4, there are provided a pair of protrusions 40 of triangular shape extending upward at positions halving the circumference of the upper end surface of the reciprocable driven gear 24 facing toward the worm bearing box 36, while notches 41 of triangular shape are formed at the lower end of the worm bearing box 36 housed in the main body 12, to provide an indexing reference position corresponding to the protrusions 40. The protrusions 40 are adapted to releasably engage the notches 41 through the reciprocating movement of the driven gear 24.

The protrusions 40 and the notches 41 will vertically and accurately confront each other when the worm shaft 31 makes one complete rotation (or rotations, an integer times one rotation), but will not vertically and accurately confront each other if the worm shaft 31 has a slight rotational lag due to a lag in meshing arising from the internal structure of the one-way clutches 20 and 21. In this case, axial displacement of the protrusions 40 will cause each protrusion to be brought into engagement with one slant face 42 of each notch 40 for providing a reference of indexing, whereby the axial displacement of the protrusions is converted into a circumferential displacement to consequently correct the rotational lag of the worm shaft and to place the worm shaft 31 in its accurate indexing position.

The operation of the above embodiment will be hereinafter explained. In the above construction, the indexing angle of the indexing table 47 is proportional to the rotational angle of the input shafts 4 and 5. The synchronized tap function of the machining center synchronizes the rotational angle of the main spindle 3 with its axial displacement, and hence the rotational angles of the input shafts 4 and 5 are determined by the axial displacement Z of the main spindle 3 rotating the input shafts 4 and 5, which results in the determination of the indexing angle of the indexing table 47. That is, where the total reduction ratio from the input shafts 4 and 5 to the indexing table 47 is 1/r, the tap pitch is P, and the indexing angle of the indexing table is $\theta$, an equation $Z = P \times \theta \times r / 360$ is established.

In this embodiment, the value of Z taken when $\theta = 5$ degrees (minimum indexing angle) represents a minimum axial displacement for indexing, and a value which is an integral multiple of that displacement is previously stored in a control unit of the machining center as an axial displacement Zn corresponding to the indexing angle. In addition, a stroke L1 of the input shafts 4 and 5 which is required for disengaging the positioning pin 56 from the clamp plate 53 and then disengaging the protrusion 40 from the notches 41 is also stored in the control unit. Accordingly, what is needed for alteration of the indexing angle $\theta$ is only to alter the value Zn, thus ensuring an easy setting. Furthermore, since the rotational angle of the main spindle 3 can be accurately controlled by virtue of the synchronized tap function, there is no need for the provision of the wiring connection or the like through which signals obtained by detecting the indexing in the main body of the indexing device are supplied to the machine tool for the control.

Figure 7:
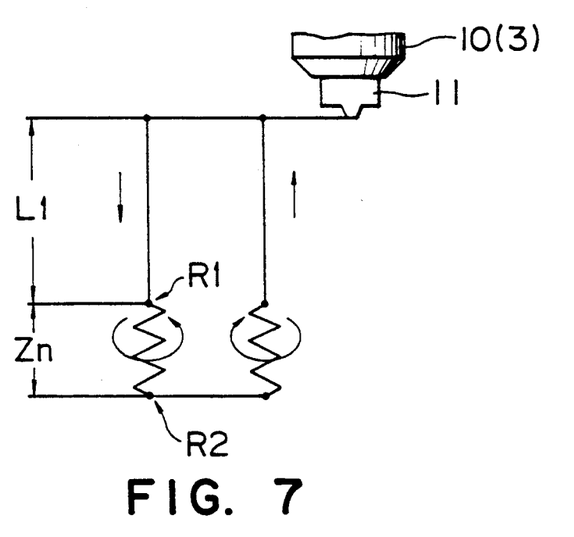
FIG. 7 is an explanatory drawing for the action of the main spindle.

When effecting indexing under such conditions, the main spindle 3 is positioned directly above a predetermined one of the input shafts 4 and 5, for example, above the input shaft 4 in accordance with a program input into the control unit. The main spindle 3 is then lowered without rotation, thereby fitting the clutch member 11 of the main spindle to the clutch member 18 of the input shaft 4. When the main spindle 3 is lowered with the clutch members 11 and 18 engaging with each other to a rotation start position R1 (FIG. 7), the support sleeve 13 is also lowered together with the input shaft 4, and the pin 62 of the transmission slider 60 is guided along the guide groove 64 formed on the outer surface of the support sleeve 13, thus axially retracting the transmission slider 60 by a distance P (FIG. 6). At that time, the pin 63 is shifted along the transversely extending groove 67 provided on the outer surface of the support sleeve 14.

Concurrently, the pin 58 located on the tip of the transmission slider 60 acts on the guide groove 57, to shift the positioning slider 55 to the left as viewed in FIG. 2, thereby disengaging the positioning pin 56 from the clamp plate 53. Moreover, with the descent of the input shaft 4, the drive gear 22 located at the lower end of the shaft 4 is brought into abutment with the ring plate 32 to press down the driven gear 24, whereby the protrusions 40 are disengaged from the notches 41 after the disengagement of the positioning pin 56 from the clamp plate 53, thus allowing free rotation of the driven gear 24. When arriving at the rotation start position R1, the main spindle 3 starts clockwise rotation with its rotational angle synchronized with its axial displacement by virtue of the synchronized tap function. This rotation causes clockwise rotation of the input shaft 4, but the drive gear 22 is not caused to rotate under the function of the one-way clutch 20, and the indexing table 47 does not effect the indexing rotation.

In the case where the clutch member 11 fails to engage the clutch member 18, the input shaft 4 is excessively moved downward by the height of the tooth of the clutch 11. Then, the clockwise rotation of the main spindle 3 will immediately allow the two clutch members 11 and 18 to be fitted with each other as soon as they confront exactly. , When the input shaft 4 is lowered by L1 + Zn to a stop position R2 (FIG. 7), the main spindle 3 comes to a stop due to the synchronized tap function, and is thereafter raised while rotating counterclockwise with the synchronism between the rotational angle and the axial displacement as is described above. The input shaft 4 is rotated counterclockwise by an amount corresponding to the indexing angle θ during the upward axial displacement Zn for returning to the rotation start position R1, which counterclockwise rotation is transmitted to the drive gear 22 through the one-way clutch 20. Furthermore, the rotation of the drive gear 22 is transmitted to the worm wheel 46 of the orthogonal gear transmission 30 through the driven gear 24, and the worm wheel 46 rotates the indexing table 47 for indexing. At this time, the other input shaft 5 is simultaneously rotated with its drive gear 23 which is rotated by the driven gear 24, but this does not at all obstruct the indexing operation.

Due to an unavoidable structural play in the one-way clutch 20, there may be a slight rotational lag of the drive gear 22 relative to the rotation of the input shaft 4, which in turn results in the rotational lag of the worm shaft 31, so that the protrusions 40 and the notches 41 may not be allowed to be vertically and correctly opposed with each other and may be slightly offset circumferentially upon returning to the rotation start position R1. When the main spindle whose rotation has been stopped at the rotation start position R1 is further raised, the driven gear 24 will be pushed up under the influence of the axial compressive force of the spring 34, and the protrusions 40 will be rotated circumferentially by virtue of the slant surface 42 of the notch 41 of the worm bearing box 36, and be fitted into the notches 41 providing the indexing reference position for the correction of the rotational lag of the worm shaft 31.

After the indexing table 47 is accurately stopped at the desired indexing position through this correction, the main shaft 3 will be further raised and the support sleeve 13 which has been pressed down will be pushed back upwardly by the compressive force of the spring 25, to shift the positioning pin 56 of the positioning slider 55 to the right as viewed in FIG. 2 through the transmission slider 60, thus interlocking the meshing claws 52 of the clamp plate 53 with the positioning pin 56 to consequently lock the clamp plate 53 at the indexing position. In this manner, the positioning of the indexing device can be executed through the axial displacement of the input shaft 4, the transmission slider 60, and the positioning slider 55, which contributes to a compact construction and a reduction of the required space. After a further ascent of the main shaft 3 for disengaging both the clutch members 11 and 18 from each other, the drive adapter 10 of the main spindle 3 will be replaced by a tool to be used for the subsequent machining at a predetermined tool replacement position.

It should be noted that when performing the indexing rotation by way of the input shaft 5, the main spindle 3 is sequentially controlled to rotate counterclockwise, stop, and rotate clockwise, thus rotating the indexing table 47 to indexing in the direction opposite to that of the rotation by means of the input shaft 4. Thus, through the provision of the two input shafts 4 and 5 which are rotated oppositely to each other, the indexing rotational angle of the indexing table 47 can be made not more than 180 degrees for each of the input shafts 4 and 5, which enables a shortcut indexing to be performed. Naturally, only one of the input shafts 4 and 5 may be provided.

In the present invention described hereinbefore, at least one input shaft is rotatably and axially displaceably provided inside the main body, and the oneway clutch is provided in a transmission mechanism between the input shaft and the indexing table. As a result, the indexing can be carried out with the aid of the control function (synchronized tap function) of the machine tool which sequentially controls the main spindle for a forward rotation, stop, and a reverse rotation while synchronizing the axial feed per revolution of the main spindle with the rotational angle of the main spindle. The use of such a synchronized tap function makes it possible to accurately control the rotational angle of the main spindle, thus eliminating the need for a series of operations in which the indexing rotation is detected in the main body of the indexing device, and the obtained signals are transmitted to the machine tool, as well as for a wiring for that purpose. In addition, the alteration of the indexing angle of the indexing table can be done by merely altering the amount of feed per revolution of the main spindle in the axial direction of the input shaft, which facilitates the setting of the indexing angle.

Furthermore, in the present invention, movable correction means is brought into engagement with stationary correction means for compensational rotation of the worm shaft, previous to the positioning of the indexing table, and accordingly any rotational lag or rotational gain which may occur in the worm shaft can be corrected. Moreover, a backlash that may exists in a one-way clutch which may be provided in a rotational transmission mechanism for transmitting the rotation to the worm shaft does not affect the accurate indexing.

Moreover, in the device according to the present invention, an axial displacement of the input shaft is converted into an axial displacement of a transmission slider, and an axial displacement of the transmission slider is converted into an axial displacement of the positioning slider, to thereby engaging and disengaging the positioning pin with and from the positioning clamp means. This reduces the required space and the size of the entire indexing device, as compared with the use of a swing lever, and allows the input shaft to be provided in any optional position.

While a particular embodiment of the present invention has been illustrated and described, it would be obvious to those skilled in the art that various changes and modifications can be made without departing from the spirit and scope of the present invention set forth in the claims.

What is claimed is:

1. An indexing device, comprising:
   a driver adapter releasably mounted on a machine tool main spindle, said drive adapter having an end with a first clutch member thereon;
   a main body having an input shaft rotatably supported therein, said input shaft having, at an end thereof, a second clutch member adapted to be engaged with said first clutch member;
   an indexing table having a rotational shaft separate from said input shaft rotatably supported on said main body and operatively connected to said input shaft by a rotation transmission mechanism such that said indexing table can be indexed by rotation of said main spindle;
   means for slidably supporting said input shaft in an axial direction of said input shaft such that, when said main spindle is advanced and rotates in a synchronized tapping function, said input shaft is moved to undergo a shafting movement and remote with said shifting movement through said drive adapter and said first clutch member being engaged with said second clutch member;

a first spring biasing said input shaft with an axial spring force against said shifting movement; and a one-way clutch in said rotation transmission mechanism transmitting rotation in one rotational direction only from said input shaft to said rotational shaft of said indexing table.

2. The indexing device of claim 1 and further comprising a support sleeve in said main body rotatably supporting said input shaft therein, said support sleeve being supported in said main body so as to be shiftable in said axial direction together with said input shaft.

3. The indexing device of claim 1, wherein said rotation transmission mechanism further includes a drive gear on said input shaft and a worm shaft parallel to said input shaft, said worm shaft having a driven gear thereon in mesh with said drive gear and a worm thereon in mesh with a worm wheel coaxially rotatable with said indexing table.

4. The indexing device of claim 3, wherein:

said driven gear is axially movable on said worm shaft, biased in an axial direction by a second spring, and has an abutment thereon against which said drive gear abuts to move said driven gear axially on said worm shaft to a retracted position against the force of said spring when said input shaft is axially shifted in said shifting movement; and an indexing corrector provided between said driven gear and said main body, said indexing corrector comprising a protrusion on one of said driven gear and said main body such that said other of said driven gear and said main body such that said protrusion engages with said notch to attain a correct indexed position when said driven gear axially moves back from said retracted position.

5. The indexing device of claim 4, wherein said protrusion further comprises a plurality of triangular protrusions, and said notch comprises a plurality of notches having a shape complementary to said triangular protrusions, said shape including a pair of slant faces.

6. The indexing device of claim 1, wherein:

a second input shaft is rotatably supported in said main body, said second input shaft having, at an end thereof, a further second clutch member adapted to be engaged with said first clutch member, one said input shaft being adapted to be engaged by said drive adapter for clockwise rotation, and the other said input shaft being adapted to be engaged by said drive adapter for counter-clockwise rotation; and each said input shaft has a drive gear thereon as part of said rotation transmission mechanism engaging a driven gear operably connected with said rotational shaft of said indexing table.

7. The indexing device of claim 1, wherein said one-way clutch is inoperative to transmit rotation in a forward direction from said input shaft to said rotational shaft of said indexing table when said input shaft undergoes said shifting movement to be retracted from a rotation start position and rotates in said forward direction, and said one-way clutch is operative to transmit rotation in a reverse direction from said input shaft to said rotational shaft of said indexing table when said input shaft undergoes a return to said rotation start position and rotates in a reverse direction.

8. An indexing device, comprising:

a drive adapter releasably mounted on a machine tool main spindle, said drive adapter having an end with a first clutch member thereon;

a drive adapter releasably mounted on a machine tool main spindle, said drive adapter having an end with a first clutch member thereon;

a main body having an input shaft rotatably supported therein, said input shaft having, at an end thereof, a second clutch member adapted to be engaged with said first clutch member;

an indexing table rotatably supported on said main body and operatively connected to said input shaft by a rotation transmission mechanism such that said indexing table can be indexed by rotation of said main spindle, said indexing table having a clamp plate with claws thereon coaxially rotatable therewith;

means for slidably supporting said input shaft in an axial direction of said input shaft such that, when said main spindle is advanced, said input shaft is moved to undergo a shifting movement in said axial direction together with said main spindle; disengagement of said positioning pin with and from said clamp plate.

9. The indexing device of claim 8, wherein said motion converting means comprises a transmission slider engaging said support sleeve so as to convert the axial movement of said support sleeve into linear movement of said transmission slider, and a positioning slider, having said positioning pin thereon, engaging said transmission slider into a linear movement, in a 10. The indexing device of claim 9, wherein said support sleeve has an outer surface with an oblique guide groove thereon with which a guide pin on said transmission slider is engaged.

11. The indexing device of claim 9, wherein said positioning slider has an oblique guide groove therein with which an engagement pin on said transmission slider is engaged.

12. An indexing device, comprising:

a drive adapter releasably mounted on a machine tool main spindle, said drive adapter having an end with a first clutch member thereon;

a main body having an input shaft axially slidably and rotatably supported therein, said input shaft to said indexing table through said one-way clutch such that axial movement and rotation of said main spindle with said first clutch member engaged with said second clutch member on said input shaft in one direction causes said one-way clutch to transmit rotation from said input shaft to said indexing table.

* * * * *